B. HENLEY.
SWIVEL COUPLING.
APPLICATION FILED DEC. 1, 1905. RENEWED SEPT. 21, 1908.
923,519.
Patented June 1, 1909.
2 SHEETS—SHEET 2.
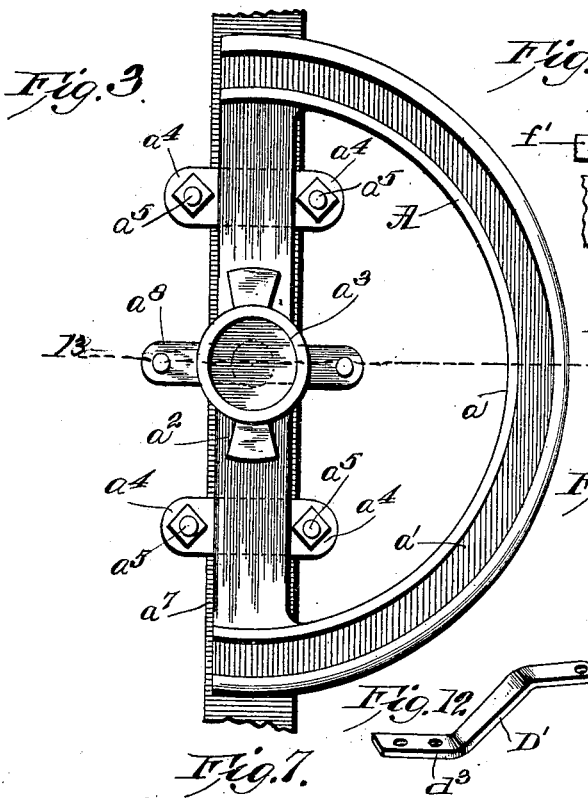
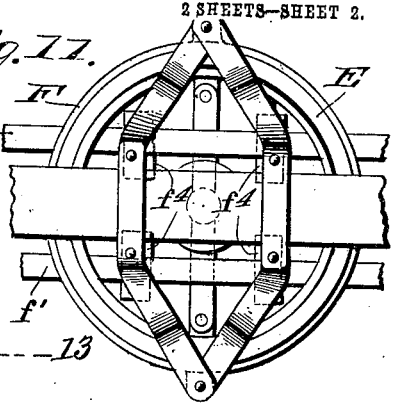
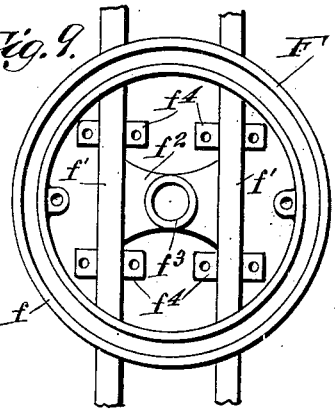
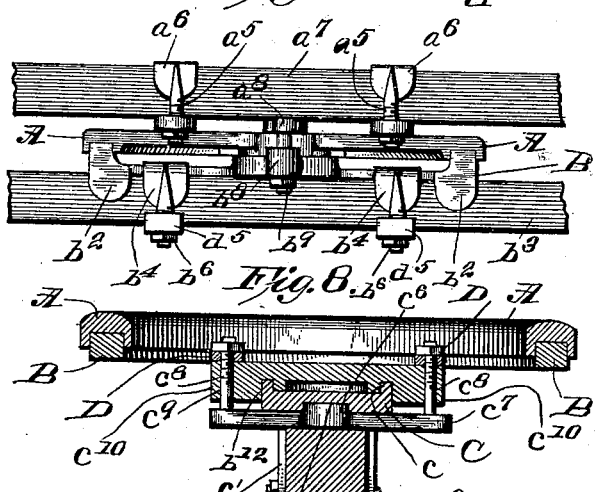
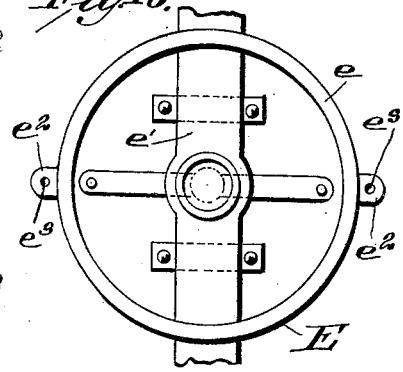
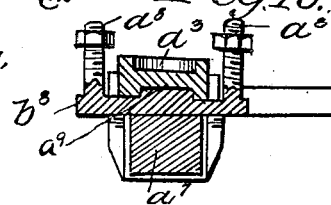
WITNESSES:
INVENTOR
BROWN HENLEY
BY
ATTORNEYS

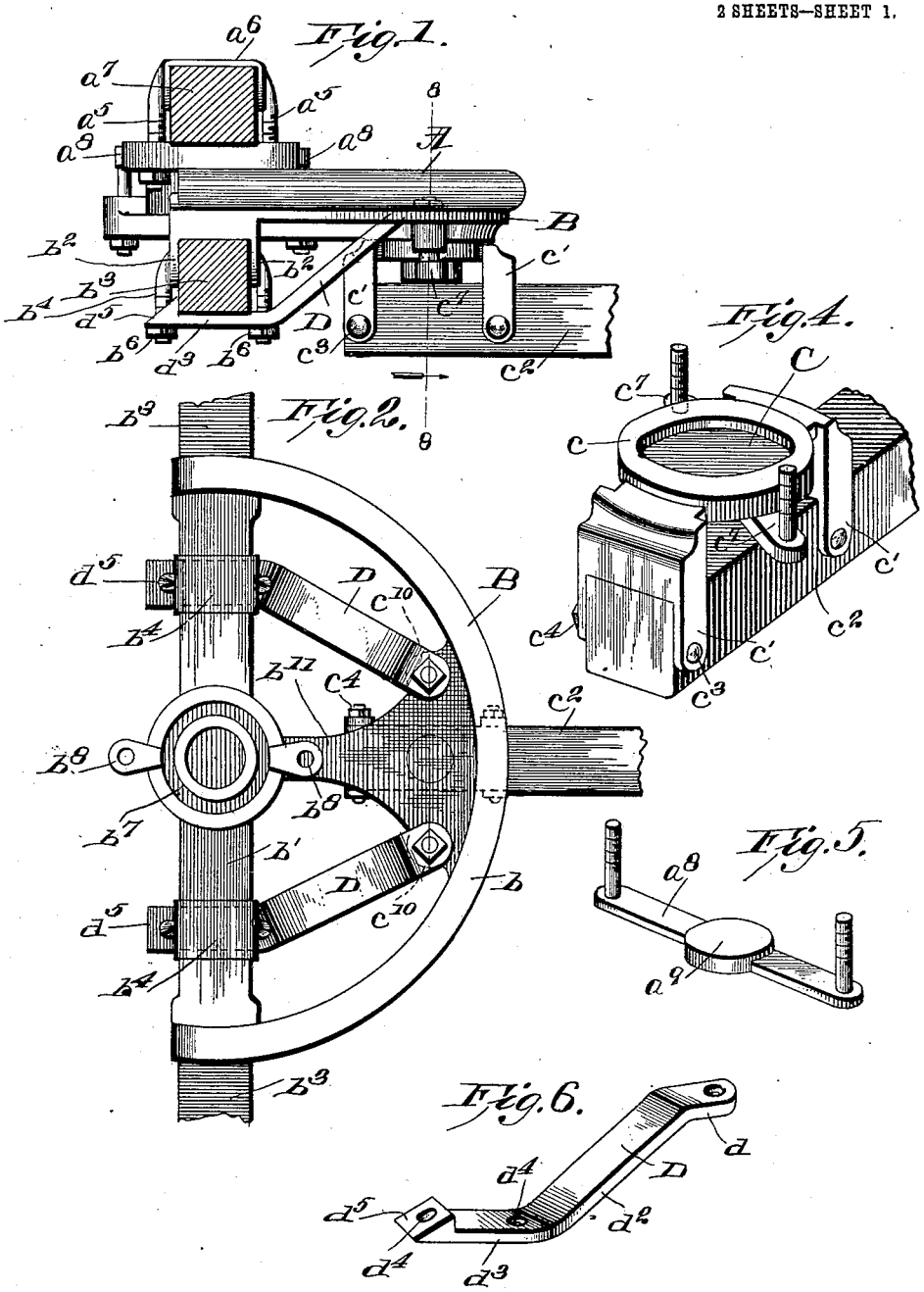

UNITED STATES PATENT OFFICE.

BROWN HENLEY, OF EDINBURG, PENNSYLVANIA.

SWIVEL-COUPLING.

No. 923,519.     Specification of Letters Patent.     Patented June 1, 1909.

Application filed December 1, 1905, Serial No. 289,868. Renewed September 21, 1908. Serial No. 454,005.

*To all whom it may concern:*

Be it known that I, BROWN HENLEY, a citizen of the United States, and resident of Edinburg, in the county of Lawrence and State of Pennsylvania, have invented certain new and useful Improvements in Swivel-Couplings, of which the following is a specification.

My invention is an improvement in swivel couplings, and consists in certain novel constructions and combinations of parts hereinafter described and claimed.

My present invention is an improvement over Letters Patent No. 540,162 and No. 558,808, granted to me for a swivel or pivot coupling adapted to connect two parts that require to rotate upon each other.

Referring to the drawings forming a part hereof—Figure 1 is a side view of my invention; Fig. 2 is a top plan view of the lower or tenon part of the coupling; Fig. 3 is a bottom plan view of the upper or socket part of the coupling; Fig. 4 is a perspective view of the end of the reach and the plate by which it is coupled to the fifth wheel; Fig. 5 is a detail perspective view of the clip connected therewith; Fig. 6 is a similar view of the brace; Fig. 7 is a front view of the coupling; Fig. 8 is a section on the line 8—8 of Fig. 1; Fig. 9 is a top plan view of the lower part of a coupling for vehicles provided with duplex springs; Fig. 10 is a similar view of the bottom part; Fig. 11 is a top plan view of the complete coupling; and Fig. 12 is a detail perspective view of the modified form of brace used in the couplings shown in Figs. 9, 10, 11. Fig. 13 is a section on the line 13—13 of Fig. 3.

The coupling shown in the above figures, is a fifth wheel for vehicles and is composed of an upper or socket part A, and a lower or tenon part B, which fit together as shown in Figs. 1 and 7, and are adapted to rotate upon each other. The part A, consists of a half circle $a$, provided upon its lower face with a groove $a'$, the ends of the half circle being connected by a cross-bar $a^2$. The cross-bar $a^2$, is provided at its center with an annular ridge $a^3$, and on either side of the ridge about midway between the same and the groove $a'$, are arranged bars $a^4$, having in each end perforations for receiving the shanks $a^5$ of clips $a^6$, whereby the socket portion may be connected to the bolster $a^7$.

The bars $a^4$, are arranged between the cross-bar and the bolster, and at the center of the cross-bar is a third clip $a^8$, provided at its central portion with a circular projection $a^9$, received in a socket upon the upper face of the cross-bar $a^2$.

The lower or tenon portion B of the coupling, comprises a half circle $b$, adapted to fit within the groove $a'$ of the socket portion A, and a cross-bar $b'$, provided at each end with oppositely arranged lugs $b^2$, adapted to fit upon either side of the axle $b^3$. The cross-bar is secured to the axle $b^3$, by means of the clips $b^4$, the shanks of the clips extending below the axle and secured thereto by means of the nuts $b^6$.

An annular groove $b^7$, for receiving the annular ridge $a^3$, is arranged on the upper face at the center of the cross-bar $b'$, and the cross-bar is provided at each side with lugs $b^8$, having holes for receiving the shanks of the clips $a^8$, secured therein by nuts $b^9$.

A plate $b^{11}$, connects the cross-bar $b'$ with the half circle $b$, the plate being arranged at right angles to the cross-bar, and being integral therewith and with the half circle.

Adjacent to the half circle, the plate is provided on its lower face with an annular groove $b^{12}$, adapted to receive the edge of an annular ridge $c$, upon the upper face of a plate C, the plate being provided at each end thereof, with downwardly projecting lugs $c'$, arranged upon either side of the reach $c^2$, and connected thereto by means of the bolts $c^3$, traversing the lugs and the reach, and secured by the nuts $c^4$. The lower face of the plate C, is provided with a socket $c^5$, for receiving a circular projection $c^6$, upon the upper face of a clip $c^7$, provided at either end with upwardly projecting, screw-threaded shanks $c^8$, which traverse openings $c^9$, in lugs $c^{10}$, arranged upon either side of the plate adjacent to the annular groove $b^{12}$.

In Fig. 6 I have shown a brace D, comprising a horizontal portion $d$, provided with an opening for receiving the shank $c^8$ of the clip $c^7$, an angular portion $d^2$, and a horizontal portion $d^3$, resting upon the lower face of the axle $b^3$, and provided with perforations $d^4$, for receiving the shanks of the clip $b^4$. The horizontal portion $d^3$, is provided at its outer end with a shoulder $d^5$, the shoulder forming together with the angular portion, stops between which is received the axle.

A brace D is arranged upon either side of the fifth wheel, connecting each of the clips $b^4$ with the corresponding shank of the clip $c^7$. The above-described arrangement of braces permits the reach connection to make a direct pull upon the axle, allowing the vehicle to make a short turn, and adds strength to the vehicle, as well as being neat in appearance.

In Figs. 9 and 10, I have shown my improved braces as applied to a fifth wheel suitable for use with a duplex spring or bar, four braces being used in this construction, two extending toward the rear of the vehicle, and two toward the front.

In the above construction, the upper portion of the fifth wheel E, comprises a circle $e$, the sides of the circle being connected by a diametrical plate $e'$, similar in all respects to the cross-bar $b'$, of the lower plate B, before described. Lugs $e^2$, are arranged upon the circumference of the circle at points 90 degrees from the ends of the diametrical bar, the lugs being provided with openings $e^3$, for receiving the shanks of a clip similar in all respects to the clip $a^8$, before described, and arranged between the bolster and the upper part E of the fifth wheel. The lower part F, of the fifth wheel, comprises a circle $f$, the circle being crossed by parallel plates $f'$, connected at the center of the circle by a cross-bar $f^2$, the upper face of the cross-bar being provided with a ridge $f^3$, similar in all respects to the ridge $a^3$, before described. The plates $f'$, are adapted to receive the duplex spring or the double bars, and are provided with lugs $f^4$, having openings to receive the shank of the clips by which the portion F is secured to the openings.

The portion F, of the fifth wheel, is spaced apart from the double bars, in the same manner that the socket A is spaced apart from the bolster, and the clip rests between the bars and the said lower portion.

The braces D' in the present construction extend from the clips on the lower axle, to the openings in the lugs $e^2$ on the sides of the upper portion E of the fifth wheel, and are like the braces D, before described, except that they are not provided with the shoulder $d^5$, since the horizontal portions $d^3$ of the two braces overlap on the bolster.

The wear on both the reach coupling and the fifth wheel coupling may be easily taken up by tightening the nuts of the clips $c^7$, $a^8$, respectively. The sockets for receiving the circular portions on the clips is concentric with the annular ridges $a^3$, $c$, on the fifth wheel and the reach couplings, respectively, thus obviating any rocking of the couplings upon each other.

Having thus described my invention, what I claim as new and desire to secure by Letters Patent is—

1. In apparatus of the class described, the combination with the vehicle axle and the upper bolster, of a coupling comprising upper and lower parts each composed of a half circle connected at its ends by a cross-bar, the half circle of the upper part being grooved to receive the half circle of the lower part, the upper cross-bar being provided on its upper face with a centrally arranged socket and on its lower face with a similarly arranged annular ridge, the lower cross-bar being provided on its upper face with an annular groove to receive the annular ridge, and with oppositely projecting lugs adjacent to the groove, and upon its lower face at the corners thereof with downwardly projecting lugs for engaging the axle, bars connected with the upper cross-bar and between the same and the bolster, clips connecting the bars with the bolster, a clip between the bolster and the cross-bar and having a projection for engaging the socket in the upper face thereof, the shanks of the clip engaging the lugs on the lower cross-bar, a reach, and means whereby to rotatably secure the reach to the lower part of the coupling.

2. In apparatus of the class described, the combination with the vehicle axle and the upper bolster, of a coupling comprising upper and lower portions secured to the bolster and the axle, respectively, and rotatable upon each other, the lower portion of the coupling having upon its lower face an annular groove, a reach, a plate on the reach and spaced apart therefrom and having depending lugs engaging the sides thereof, bolts traversing the reach and the lugs, the plate having upon its upper face an annular ridge engaging the annular groove of the lower portion of the coupling, a clip arranged between the plate and the reach and having a projection engaging a socket in the lower face of the plate, the shanks of the clip engaging oppositely arranged openings in the lower portion of the coupling and nuts engaging the shanks for securing the clip to said lower portion.

3. In apparatus of the class described, the combination with the fifth wheel comprising an upper portion, and a lower portion provided with an annular groove on its lower face and laterally projecting lugs adjacent the groove, of a reach, a plate on the reach and spaced apart therefrom, the plate having on the upper face thereof an annular ridge for engaging the annular groove, and downwardly projecting lugs at the corners for engaging the sides of the reach, bolts traversing the lugs and the reach, a clip between the reach and the plate, and having an annular projection engaging a circular depression in the lower face of the plate, the shanks of the clip traversing the lugs in the lower portion of the coupling, and nuts engaging the shanks for securing the clip to said lower portion.

4. In apparatus of the class described, the combination with the vehicle axle and the upper bolster, of a coupling comprising upper and lower portions, clips for securing the upper portion to the bolsters and for securing the lower portion to the axle, a reach, a clip rotatably connected with the reach, and engaging the lower portion of the coupling, a plurality of braces connecting the clip on the reach with the axle, each comprising a bar having a horizontal portion for engaging the lower face of the axle, and a shoulder for engaging the side thereof, an angular portion, and a horizontal portion for engaging one of the shanks of the clip on the reach.

5. In apparatus of the class described, the combination with the vehicle axle and the upper bolster, of a coupling comprising upper and lower portions rotatable upon each other, clips for securing the upper and lower portions to the bolster and the axle, respectively, a reach, a plate on the reach, and spaced apart therefrom, a clip rotatably mounted between the plate and the reach and engaging the lower portion of the coupling, and a plurality of braces connecting the shanks of the last-named clip, with the axle.

6. A fifth wheel and reach coupling comprising a plate spaced apart from the reach and having lugs depending upon either side thereof, the plate being provided with a circular projection upon its upper face for engaging a circular depression in the fifth-wheel, and with a circular socket on its lower face, a clip between the reach and the plate and having a circular projection for engaging the socket, and means for securing the clip to the fifth wheel.

BROWN HENLEY.

Witnesses:
  CHAS. E. PETERSON,
  MAX E. BRUNSWICK.